US011458629B2

(12) United States Patent
Yoshikuwa

(10) Patent No.: US 11,458,629 B2
(45) Date of Patent: Oct. 4, 2022

(54) ROBOT SYSTEM AND METHOD OF OPERATING THE SAME

(71) Applicant: KAWASAKI JUKOGYO KABUSHIKI KAISHA, Kobe (JP)

(72) Inventor: Eiji Yoshikuwa, Kakogawa (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 17/096,999

(22) Filed: Nov. 13, 2020

(65) Prior Publication Data

US 2021/0060781 A1 Mar. 4, 2021

Related U.S. Application Data

(63) Continuation of application No. PCT/JP2019/018611, filed on May 9, 2019.

(30) Foreign Application Priority Data

May 15, 2018 (JP) .............................. JP2018-094015

(51) Int. Cl.
*B25J 9/00* (2006.01)
*B25J 9/16* (2006.01)
*B25J 13/08* (2006.01)

(52) U.S. Cl.
CPC ........... *B25J 9/1669* (2013.01); *B25J 9/0084* (2013.01); *B25J 13/08* (2013.01)

(58) Field of Classification Search
CPC ...... B25J 9/0084; B25J 9/0087; B25J 9/0093; B25J 9/1669; B25J 13/08; B25J 19/023
See application file for complete search history.

(56) References Cited

U.S. PATENT DOCUMENTS

| 2007/0179671 A1* | 8/2007 | Arimatsu | ........... G05B 19/4182 700/247 |
| 2015/0151430 A1* | 6/2015 | Koyanagi | .............. B25J 9/0084 700/230 |
| 2019/0184559 A1* | 6/2019 | Lager | ..................... B25J 9/1669 |
| 2021/0031360 A1* | 2/2021 | Koga | ................... B65G 47/905 |

FOREIGN PATENT DOCUMENTS

| JP | 11-49349 A | 2/1999 |
| JP | 2003-211096 A | 7/2003 |

\* cited by examiner

*Primary Examiner* — Dale Moyer
(74) *Attorney, Agent, or Firm* — Xsensus LLP

(57) ABSTRACT

A robot system includes a transfer device, a plurality of robots, a sensor configured to detect a workpiece to which a work has not yet been performed, and a controller provided to each of the plurality of robots. The plurality of robots are disposed in series in a transferring direction of a workpiece. When the sensor detects the unworked workpiece and the robot is in a stand-by state, the controller causes the robot to perform the work to the unworked workpiece, and when the sensor detects the unworked workpiece and the robot is working, the controller inhibits the robot to perform the work to the unworked workpiece.

16 Claims, 5 Drawing Sheets

ROBOT SYSTEM AND METHOD OF OPERATING THE SAME

CROSS-REFERENCE TO RELATED APPLICATIONS

The present application is a bypass continuation of and claims priority to PCT/JP2019/018611, filed on May 9, 2019, which claims priority to JP 2018-094015, filed May 15, 2018, both of which are incorporated by reference in their entirety.

TECHNICAL FIELD

The present disclosure relates to a robot system and a method of operating the robot system.

BACKGROUND ART

Cell systems for production facilities aimed at a flexible and quick response to a change in an amount of production are known (e.g., Patent Document 1). A cell system for a production facility disclosed in Patent Document 1 includes a plurality of work stations which are disposed in series in a production line and perform a given work to workpieces, a workpiece transfer device which transfers workpieces to which the work has not yet been performed to the work stations, a workpiece unloading device which transfers workpieces to which the work has been performed from the work stations, and lifting devices which load the transferred unworked workpieces to the work stations and unload the worked workpieces to the workpiece unloading devices.

In the cell system disclosed in Patent Document 1, the number of work stations is increased when the amount of production increases.

REFERENCE DOCUMENT OF CONVENTIONAL ART

[Patent Document 1] JP1999-049349A

SUMMARY

A robot system according to one aspect of the present disclosure includes a transfer device, a plurality of robots, a sensor configured to detect a workpiece to which a work has not yet been performed, and a controller provided to each of the plurality of robots and configured to control the robot. The plurality of robots are disposed in series in a transferring direction of the workpiece. When the sensor detects the unworked workpiece and the robot is in a stand-by state, the controller causes the robot to perform the work to the unworked workpiece, and when the sensor detects the unworked workpiece and the robot is working, the controller inhibits the robot to perform the work to the unworked workpiece.

According to this configuration, since the respective controllers of the plurality of robots determine whether the work can be performed to the unworked workpiece, even if the number of robots is increased in accordance with the increase in the amount of production, it is not required to change the control program. Thus, it is possible to adapt to the increase in the amount of production by the simple control.

Moreover, it is also possible to adapt to the decrease in the amount of production by simply decreasing the number of the robots, and changing the control program for the entire robot system is not required. Therefore, adaption to the decrease in the amount of production is also possible by the simple control.

Moreover, a method of operating a robot system according to one aspect of the present disclosure is provided. The robot system includes a transfer device, a plurality of robots, a sensor configured to detect a workpiece to which a work has not yet been performed, and a controller provided to each of the plurality of robots and configured to control the robot. The plurality of robots are disposed in series in a transferring direction of the workpiece. The method includes the steps of performing the work to the unworked workpiece by each of the robots when the sensor detects the unworked workpiece and the robot is in a stand-by state, and inhibiting each of the robots to perform the work to the unworked workpiece when the sensor detects the unworked workpiece and the robot is working.

According to this configuration, since the respective controllers of the plurality of robots determine whether the work can be performed to the unworked workpiece, even if the number of robots is increased in accordance with the increase in the amount of production, it is not required to change the control program. Thus, it is possible to adapt to the increase in the amount of production by the simple control.

Moreover, it is also possible to adapt to the decrease in the amount of production by simply decreasing the number of the robots, and changing the control program for the entire robot system is not required. Therefore, adaption to the decrease in the amount of production is also possible by the simple control.

DESCRIPTION OF EMBODIMENTS

Figure 1:
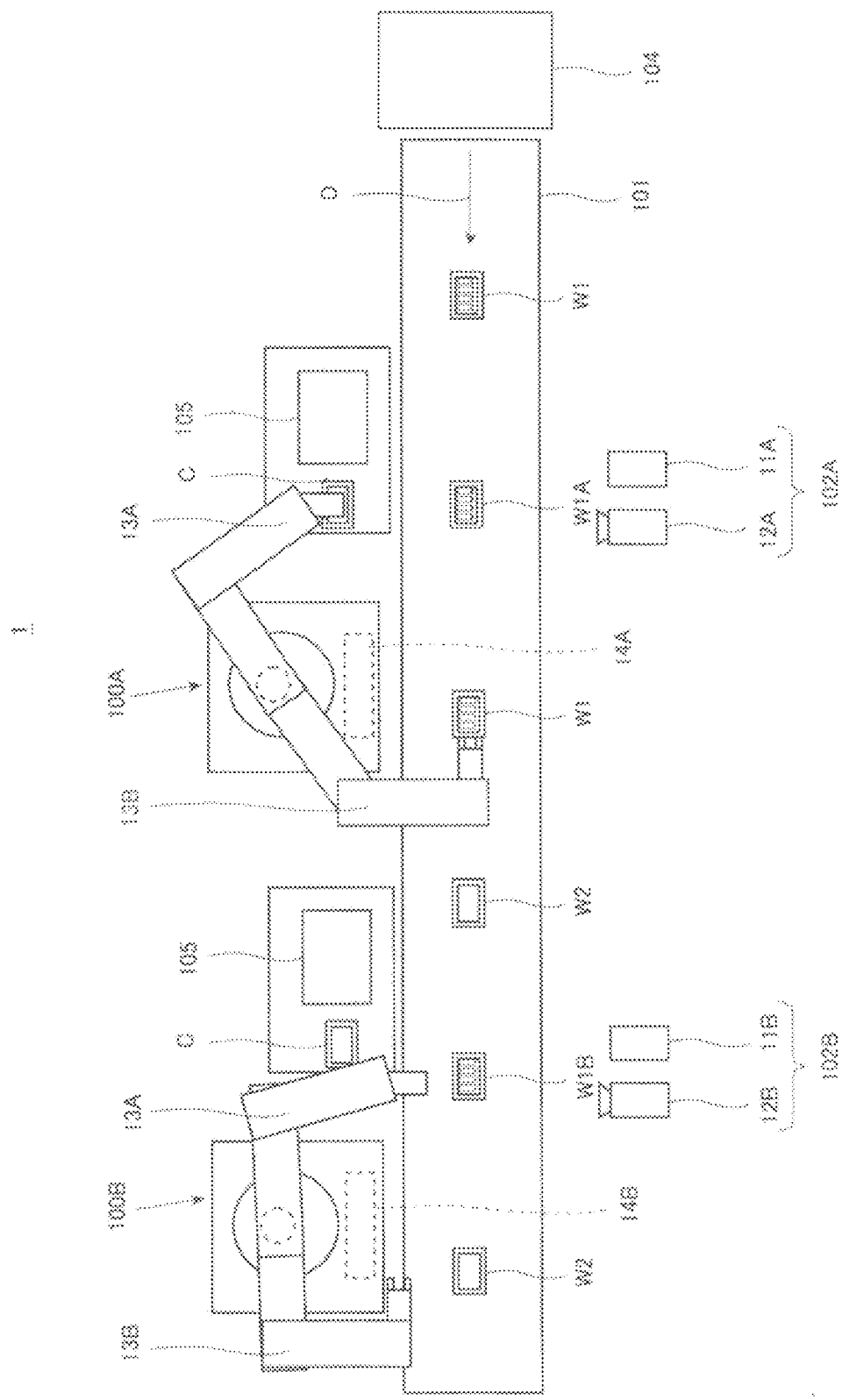
FIG. 1 is a schematic view illustrating an outline configuration of a robot system according to an exemplary embodiment.

Hereinafter, a preferred embodiment of the present disclosure is described with reference to the drawings. Note that the same reference characters are given to the same or corresponding components throughout the drawings to omit redundant description. Moreover, in all the drawings, components required to describe the present disclosure are extracted and illustrated, and other components may be omitted. The present disclosure is not limited to the embodiment described below.

A robot system according to an exemplary embodiment includes a transfer device, a plurality of robots, a sensor for detecting a workpiece to which work has not yet been performed, and a controller which is provided to each of the plurality of robots and controls the robot. The plurality of robots are disposed in series in a transferring direction of the workpiece. The controller causes the robot to perform the work to the unworked workpiece when the sensor detects the unworked workpiece and the robot is in a stand-by state. On the other hand, the controller inhibits the robot to perform the work when the sensor detects the unworked workpiece and the robot is working.

Moreover, in the robot system according to an exemplary embodiment, the sensor may be provided to each of the plurality of robots.

Moreover, in the robot system according to an exemplary embodiment, the sensor may include a first sensor which detects a position of the workpiece in the transferring direction of the workpiece, and a second sensor which detects a state of the workpiece.

Moreover, in the robot system according to an exemplary embodiment, the second sensor may detect the position of the workpiece in a height direction.

Moreover, in the robot system according to an exemplary embodiment, the second sensor may include a camera which images the workpiece.

Moreover, in the robot system according to an exemplary embodiment, the transfer device may transfer the workpiece at a given first speed set in advance, regardless of working states of the plurality of robots.

Moreover, in the robot system according to an exemplary embodiment, the plurality of robots may perform the same work as each other.

Below one example of the robot system according to an exemplary embodiment is described with reference to FIGS. 1 to 4.

Configuration of Robot System

Figure 2:
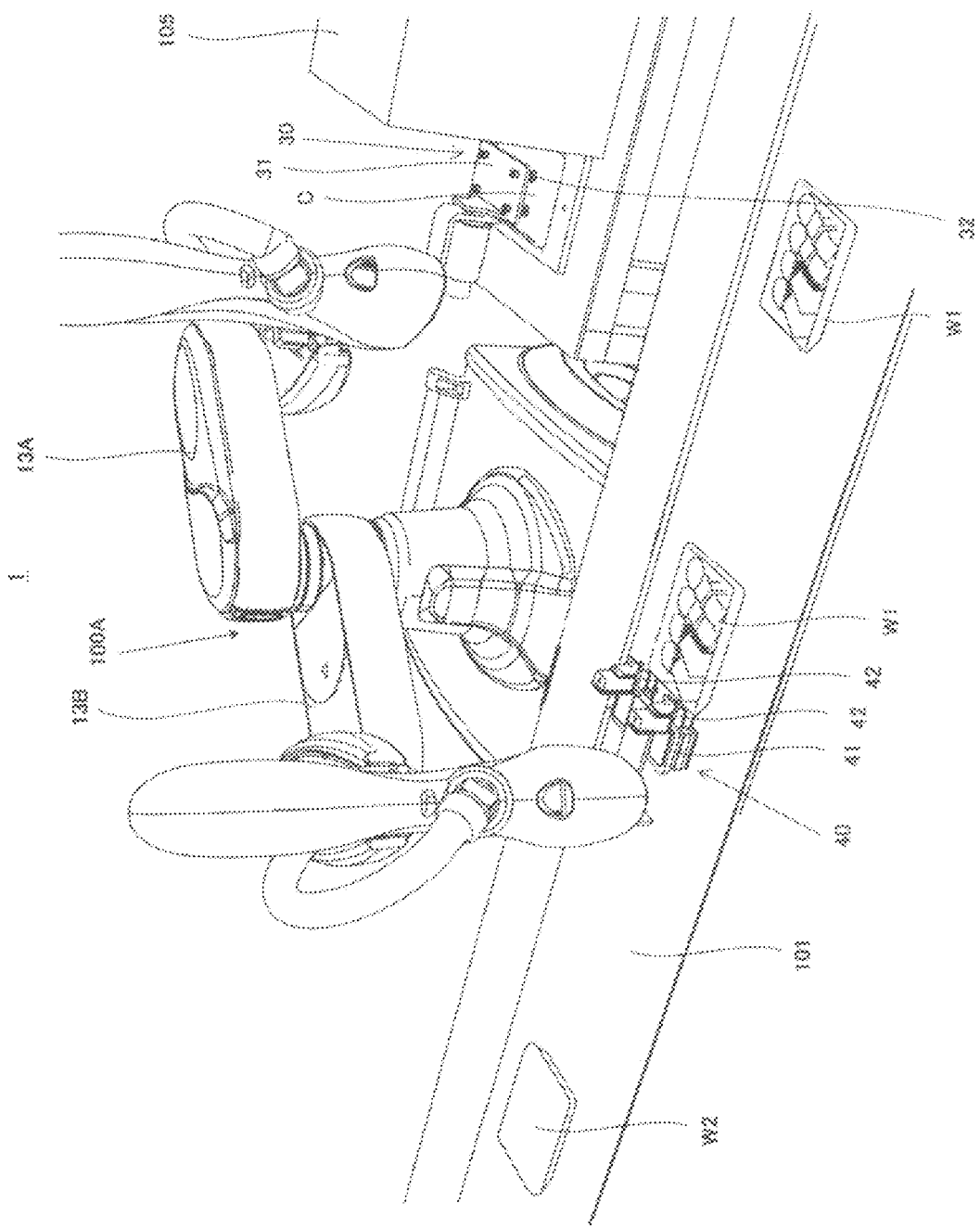
FIG. 2 is a schematic view illustrating an outline configuration of a substantial part of the robot system illustrated in FIG. 1.

FIG. 1 is a schematic view illustrating an outline configuration of a robot system according to an exemplary embodiment. FIG. 2 is a schematic view illustrating an outline configuration of a substantial part of the robot system illustrated in FIG. 1.

As illustrated in FIGS. 1 and 2, a robot system 1 according to an exemplary embodiment includes a plurality of (here, for example, two) robots 100A and 100B, a transfer device 101, sensors 102A and 102B which detect a workpiece W1 to which the work has not yet been performed, and controllers 14A and 14B provided to the respective robots 100A and 100B. Note that a robot system 1 according to an exemplary embodiment may be provided with a workpiece supply device 104 which supplies the unworked workpiece W1 to the transfer device 101, and a lid-member supply device 105 which supplies a lid member C.

Moreover, in a robot system 1 according to an exemplary embodiment, the plurality of robots 100A and 100B are disposed in series in a direction D of transferring a workpiece W, and perform the same work as each other. The controller 14A (controller 14B) causes the robot 100A (robot 100B) to perform the work to the unworked workpiece W1 when the sensor 102A (sensor 102B) detects the unworked workpiece W1 and when the robot 100A (robot 100B) is in a stand-by state. On the other hand, the controller 14A (controller 14B) does not cause the robot 100A (robot 100B) to perform the work to the unworked workpiece W1 when the sensor 102A (sensor 102B) detects the unworked workpiece W1 but when the robot 100A (robot 100B) is working.

Note that when the robot 100A and the robot 100B are not distinguished, they may simply be referred to as a "robot 100." Similarly, when the sensor 102A and the sensor 102B are not distinguished, they may simply be referred to as a "sensor 102." Moreover, when the workpiece W1 to which the work has not yet been performed, and a workpiece W2 to which the work has been performed are not distinguished, they may simply be referred to as a "workpiece W." Moreover, when the controller 14A and the controller 14B are not distinguished, they may simply be referred to as a "controller 14."

The transfer device 101 transfers the unworked workpiece W1 supplied from the workpiece supply device 104, and the worked workpiece W2. The transfer device 101 is a conveyor belt, for example.

Moreover, the transfer device 101 may transfer the workpiece W at a given first speed which is set in advance, regardless of the working states of the plurality of robots 100A and 100B. For example, even if the work by the robot 100 delays, the transfer device 101 may transfer the workpiece W at the first speed without decreasing the transferring speed, or stopping the transfer.

Note that the first speed is suitably set according to the content of work performed to the unworked workpiece W1. Moreover, the first speed may be suitably changed according to an increase and a decrease in an amount of production of the workpieces W.

The sensors 102A and 102B detect the unworked workpiece W1, and output the detected information to the controller 14A and 14B, respectively. Note that in an exemplary embodiment the sensors 102A and 102B are disposed upstream sides of the robots 100A and 100B, respectively, in the transferring direction D.

The sensor 102A can include a first sensor 11A and a second sensor 12A, and the sensor 102B can include a first sensor 11B and a second sensor 12B. Note that, below, when the first sensor 11A and the first sensor 11B are not distinguished, they may simply be referred to as a "first sensor 11." Similarly, when the second sensor 12A and the second sensor 12B are not distinguished, they may simply be referred to as a "second sensor 12."

The first sensor 11 detects the position of the workpiece W in the transferring direction, and outputs the detected information to the controller 14. The first sensor 11 is a positional sensor, for example.

The second sensor 12 detects the state of the workpiece W (whether the work has been performed or not), and outputs the detected information to the controller 14. For example, the second sensor 12 includes a camera, and image information captured by the camera may be outputted to the controller 14.

Moreover, for example, if a height dimension of the worked workpiece W2 is larger than that of the unworked workpiece W1, the second sensor 12 may be comprised of a positional sensor disposed at a height from which only the workpiece W2 can be detected.

Here, the unworked workpiece W1 includes a housing of which an upper part opens (e.g., Bento box), and food etc. is placed inside the housing. The opening part of the housing of the unworked workpiece W1 is closed with the lid member C by the robot 100, and the unworked workpiece W1 is transferred as the worked workpiece W2.

Note that although in an exemplary embodiment the work of the robot 100 closing the opening part of the housing with the lid member C is described as one example, the work performed by the robot 100 is not limited to this. For example, the robot 100 may perform the placing of food inside the housing, or packing a semiconductor inside a bag. Alternatively, for example, the robot 100 may perform the painting or welding of the unworked workpiece W1.

Here, the robot 100 is a horizontal articulated dual-arm robot provided with a pair of arms (a first arm 13A and a second arm 13B). Note that the robot 100 may be another type of robot such as a vertical articulated robot.

Here, a configuration of the robot 100 is described in detail with reference to FIG. 3.

Figure 3:
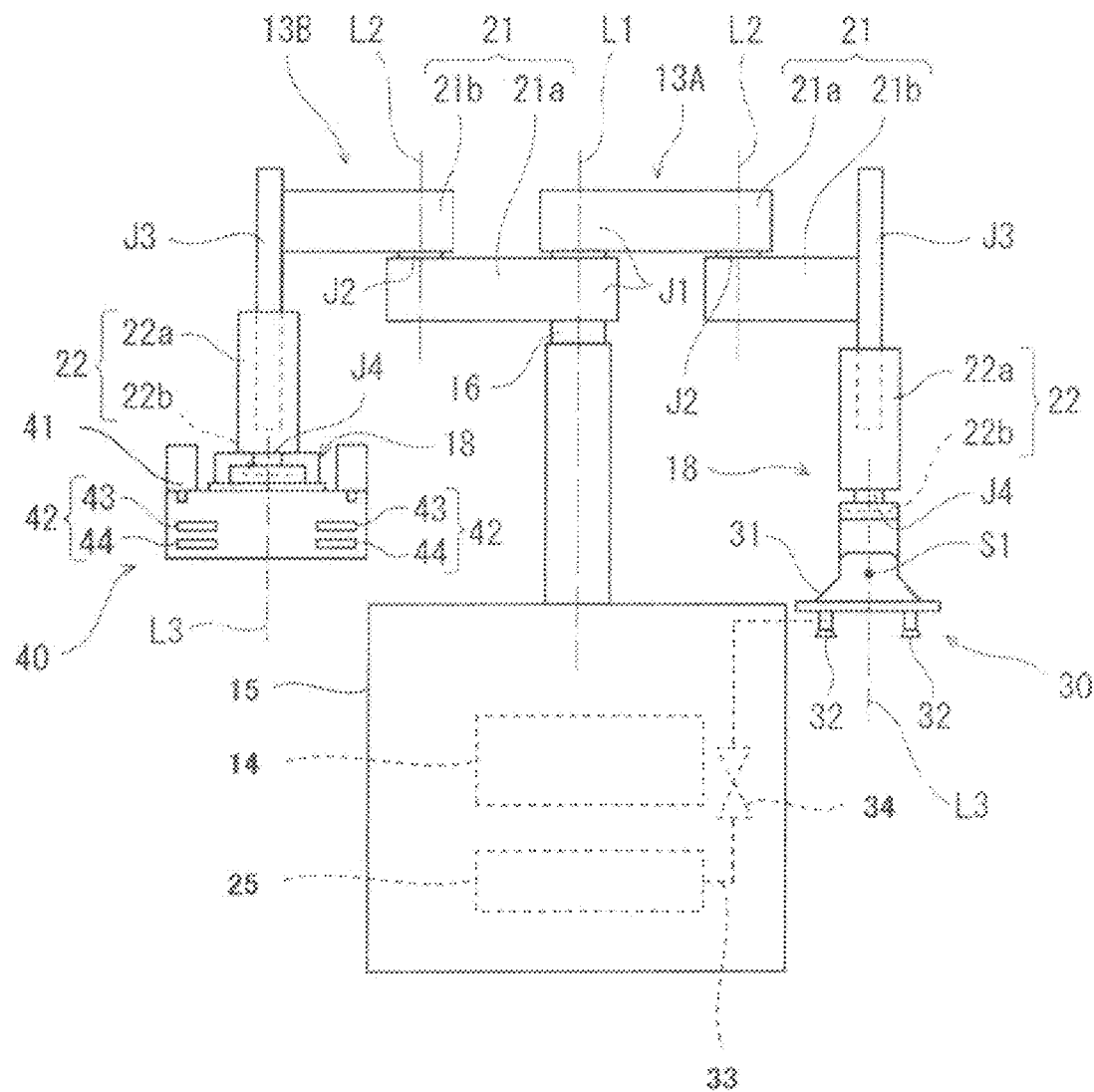
FIG. 3 is a schematic view illustrating an outline configuration of a robot of the robot system illustrated in FIG. 1.

FIG. 3 is a schematic view illustrating an outline configuration of a robot of the robot system illustrated in FIG. 1.

As illustrated in FIG. 3, the robot 100 is provided with a carriage 15, the first arm 13A, the second arm 13B, a vacuum generator 25, and the controller 14. The controller 14 controls the first arm 13A, the second arm 13B, and the vacuum generator 25. Note that although in an exemplary embodiment the controller 14 and the vacuum generator 25 are disposed inside the carriage 15, it is not limited to this configuration, and these devices may be disposed outside the carriage 15.

A base shaft 16 is fixed to an upper surface of the carriage 15. The first arm 13A and the second arm 13B are provided to the base shaft 16 so as to be rotatable about a rotation axis L1 passing through an axial center of the base shaft 16. In detail, the first arm 13A and the second arm 13B are provided with a height difference therebetween. Moreover, the controller 14 and the vacuum generator 25 are accommodated inside the carriage 15. Note that the first arm 13A and the second arm 13B can operate independently, and operate in an interlocked manner.

The first arm 13A has an arm part 21, a wrist part 22, an attaching part 18, and a first hand part 30. Similarly, the second arm 13B has the arm part 21, the wrist part 22, the attaching part 18, and a second hand part 40. Note that since configurations of the second arm 13B are similar to the first arm 13A except for the second hand part 40, detailed description except for the second hand part 18B is omitted.

In an exemplary embodiment, the arm part 21 includes a first link 21a and a second link 21b which are in a substantially rectangular shape. The first link 21a is provided with a rotary joint J1 at a base-end part thereof, and provided with a rotary joint J2 at a tip-end part thereof. The second link 21b is provided with a linear-motion joint J3 at a tip-end part thereof.

The first link 21a is coupled, at the base-end part thereof, to the base shaft 16 via the rotary joint J1, and is rotatable about the rotation axis L1 by the rotary joint J1. Moreover, the second link 21b is coupled, at a base-end part thereof, to the tip-end part of the first link 21a via the rotary joint J2, and is rotatable about a rotation axis L2 by the rotary joint J2.

The tip-end part of the second link 21b is coupled to the wrist part 22 having an elevating part 22a and a rotary part 22b via the linear-motion joint J3, so that the wrist part 22 is ascendable and descendible with respect to the second link 21b. The wrist part 22 has the elevating part 22a and the rotary part 22b. In detail, the elevating part 22a is coupled to the tip-end part of the second link 21b via the linear-motion joint J3. The rotary part 22b is coupled to a tip-end part of the elevating part 22a via a rotary joint J4, and is rotatable about a rotation axis L3 by the rotary joint J4. Moreover, the rotary part 22b is provided with the attaching part 18.

The attaching part 18 is attachable and detachable of the first hand part 30 or the second hand part 40 thereto. In detail, the attaching part 18 has a pair of stick-like members which are adjustable of a distance therebetween, and the attaching part 18 can attach the first hand part 30 or the second hand part 40 to the wrist part 22 by the pair of stick-like members sandwiching the first hand part 30 or the second hand part 40. Therefore, the first hand part 30 or the second hand part 40 is rotatable about the rotation axis L3 by the rotary joint J4. Note that a tip-end part of the stick-like member may be bent.

The first hand part 30 has a body part 31 and suction parts 32, and is swingable about a rotation axis S1 by a drive motor. The suction parts 32 are connected with the vacuum generator 25 via a pipe 33. Note that although in an exemplary embodiment a plurality of (here, for example, four) suction parts 32 are provided to the body part 31, it is not limited to this configuration. One suction part 32 may be provided to the body part 31 as long as the first hand part 30 can suck and hold the lid member C.

The vacuum generator 25 is a device to make negative pressure inside the suction part 32, and for example, a vacuum pump or CONVUM® may be used. Moreover, the pipe 33 is provided with an on-off valve 34. By the on-off valve 34 opening or closing the pipe 33, the lid member C is sucked by the suction part 32, or the suction is cancelled. Note that the operation of the vacuum generator 25, and the opening and closing of the on-off valve 34 are controlled by the controller 14.

The second hand part 40 has a body part 41 and chuck parts 42. Each chuck part 42 has a pair of pinching parts 43 and 44. The pinching parts 43 and 44 are formed in a strip shape, and lined up in a normal direction of principal surfaces of the pinching parts 43 and 44. Moreover, a drive motor is connected to the pinching parts 43 and 44 so that the pinching parts 43 and 44 approach to and separate from each other. Therefore, the pinching part 43 and the pinching part 44 can sandwich the workpiece W therebetween so as to chuck (hold) it.

Note that although in an exemplary embodiment a plurality of (here, for example, two) chuck parts 42 are provided to the body part 41, it is not limited to this configuration. One chuck part 42 may be provided to the body part 41 as long as the second hand part 40 can hold the workpiece W.

Moreover, each of the joints J1 to J4 of the first arm 13A and the second arm 13B is provided with a drive motor as one example of an actuator which relatively rotates, or ascends and descends two members coupled by the joint. The drive motor is, for example, a servomotor which is servo controlled by the controller 14. Moreover, each of the joints J1 to J4 is provided with a rotary sensor which detects a rotational position of the drive motor, and a current sensor which detects current for controlling the rotation of the drive motor. The rotary sensor is an encoder, for example.

The controller 14 is provided with a processor, such as a microprocessor and a CPU, and a memory, such as a ROM and a RAM (none of them are illustrated). The memory stores information such as a basic program and various fixed data. The processor reads and executes software such as the basic program stored in the memory so as to control various operations of the robot 100.

Note that the controller 14 may be comprised of a sole controller 14 which executes a centralized control, or comprised of a plurality of controllers 14 which execute a distributed control by cooperating with each other. Moreover, the controller 14 may include a microcomputer, or include an MPU, a PLC (Programmable Logic Controller), a logic circuit, etc. The functionality of the elements disclosed herein including but not limited to the controller 14 may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Operation and Effects of Robot System

Next, operation of the robot system (operating method) according to an exemplary embodiment and the effects thereof are described with reference to FIGS. 1 to 4. Note that the operation described below is executed by the processor of the controller 14 reading the program stored in the memory.

Figure 4:
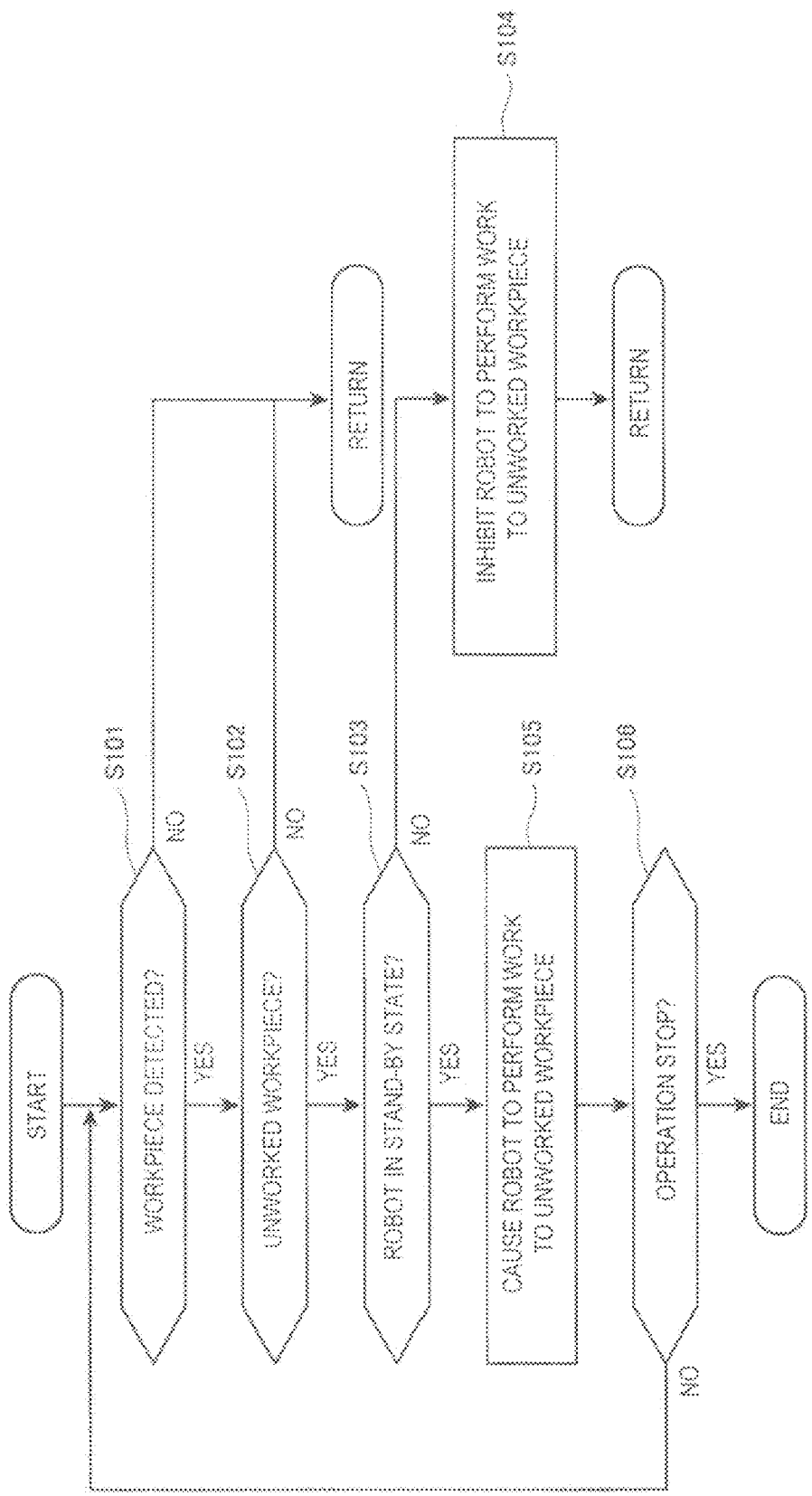
FIG. 4 is a flowchart illustrating one example of operation of the robot system according to an exemplary embodiment.

FIG. 4 is a flowchart illustrating one example of the operation of the robot system according to an exemplary embodiment.

First, as illustrated in FIG. 1, the workpiece supply device 104 supplies the unworked workpiece W1 to the transfer device 101, and the transfer device 101 transfers the unworked workpiece W1 supplied from the workpiece supply device 104, and the workpiece W2 to which the work has been performed by the robot 100.

Then, a worker (operator) inputs, via an input device, command information indicating to execute the work of closing the unworked workpiece W1 with the lid member C, to the controller 14 of each of the robots 100A and 100B.

Then, as illustrated in FIG. 4, the controller 14 determines whether the sensor 102 detects the workpiece W (Step S101). In detail, the controller 14 determines whether the information of detecting the workpiece W is inputted from the first sensor 11.

When the controller 14 determines that the sensor 102 does not detect the workpiece W (NO at Step S101), it repeats the processing at Step S101 until the controller 14 determines that the sensor 102 detects the workpiece W On the other hand, when the controller 14 determines that the sensor 102 detects the workpiece W (YES at Step S101), it executes processing at Step S102.

At Step S102, the controller 14 determines whether the workpiece W detected at Step S101 has not yet been worked.

In detail, for example, when the second sensor 12 includes the camera, the controller 14 determines whether the workpiece W detected at Step S101 has not been worked on based on the image information inputted from the second sensor 12. Alternatively, for example, when the second sensor 12 includes the positional sensor, the controller 14 determines whether the information of detecting the unworked workpiece W1 is inputted from the second sensor 12.

When the controller 14 determines that the workpiece W detected at Step S101 is not the unworked workpiece W1 (when determined to be the worked workpiece W2; NO at Step S102), it repeats the processing at Steps S101 and S102 until the controller 14 determines that the workpiece W detected at Step S101 is the unworked workpiece W1.

On the other hand, when the controller 14 determines that the workpiece W detected at Step S101 is the unworked workpiece W1 (YES at Step S102), it executes processing at Step S103.

At Step S103, the controller 14 determines whether the robot 100 is in the stand-by state. Here, the "stand-by state" means a state in which the robot 100 can perform work on the unworked workpiece W1, and is suitably set according to the transferring speed of the workpiece W by the transfer device 101, and the content of work performed by the robot 100.

In detail, for example, the stand-by state may be a state in which the robot 100 does not perform work on the workpiece W when the processing at Step S103 is executed. Alternatively, for example, the stand-by state may be a state in which the robot 100 performs work on the workpiece W and the work to the workpiece W is to be finished in a few seconds, when the processing at Step S103 is executed.

Here, as illustrated in FIG. 1, the robot 100A is in the state of performing work on the unworked workpiece W1, and the robot 100B is in the stand-by state.

Therefore, the controller 14A determines that the robot 100A is not in the stand-by state (NO at Step S103), inhibits the robot 100A to perform the work on an unworked workpiece W1A (see FIG. 1) (Step S104), and repeats the processing at Steps S101 to S104 until the controller 14A determines that the robot 100A is in the stand-by state.

On the other hand, the controller 14B determines that the robot 100B is in the stand-by state (YES at Step S103), causes the robot 100B to perform the work on an unworked workpiece W1B (see FIG. 1) (Step S105), and executes processing at Step S106. Therefore, the robot 100B holds the workpiece W1B by the second hand part 40 of the second arm 13B, sucks and holds the lid member C by the first hand part 30 of the first arm 13A, and operates to close the opening part of the workpiece W1B with the lid member C.

At Step S106, the controller 14 determines whether operation stop information for the robot system 1 is inputted via the input device. When the controller 14 determines that the operation stop information for the robot system 1 is not inputted (NO at Step S106), it repeats the processing at Steps S101 to S106 until the controller 14 determines that the operation stop information for the robot system 1 is inputted.

On the other hand, when the controller 14 determines that the operation stop information for the robot system 1 is inputted (YES at Step S106), it ends this program.

According to the robot system 1 of an exemplary embodiment configured as described above, the respective controllers 14A and 14B of the plurality of robots 100A and 100B determine whether the robots 100A and 100B can perform the work to the unworked workpiece W1. Then, when the controllers 14A and 14B determine that the work cannot be performed to the unworked workpiece W1, they do not stop the transfer device 101, but cause the transfer device 101 to transfer the workpiece W1 to the next robot.

Therefore, according to the robot system 1 of this embodiment, in order to adapt to the increase in the amount of production, it is not required, unlike the cell system for the production facility disclosed in Patent Document 1, to increase the number of the robots as well as changing the control program for the entire system, but rather simply increase the number of the robots. Thus, it is possible to adapt to the increase in the amount of production in a simple manner.

Moreover, it is also possible to adapt to the decrease in the amount of production by simply decreasing the number of the robots, and changing the control program for the entire robot system is not required. Therefore, adaption to the decrease in the amount of production is also possible by the simple control.

Modification

Next, a modification of the robot system 1 according to an exemplary embodiment is described with reference to FIG.

5. Note that since configurations of the robot system 1 according to this modification are the same as the configurations of the robot system 1 according to the exemplary embodiments described above, detailed description is omitted.

Figure 5:
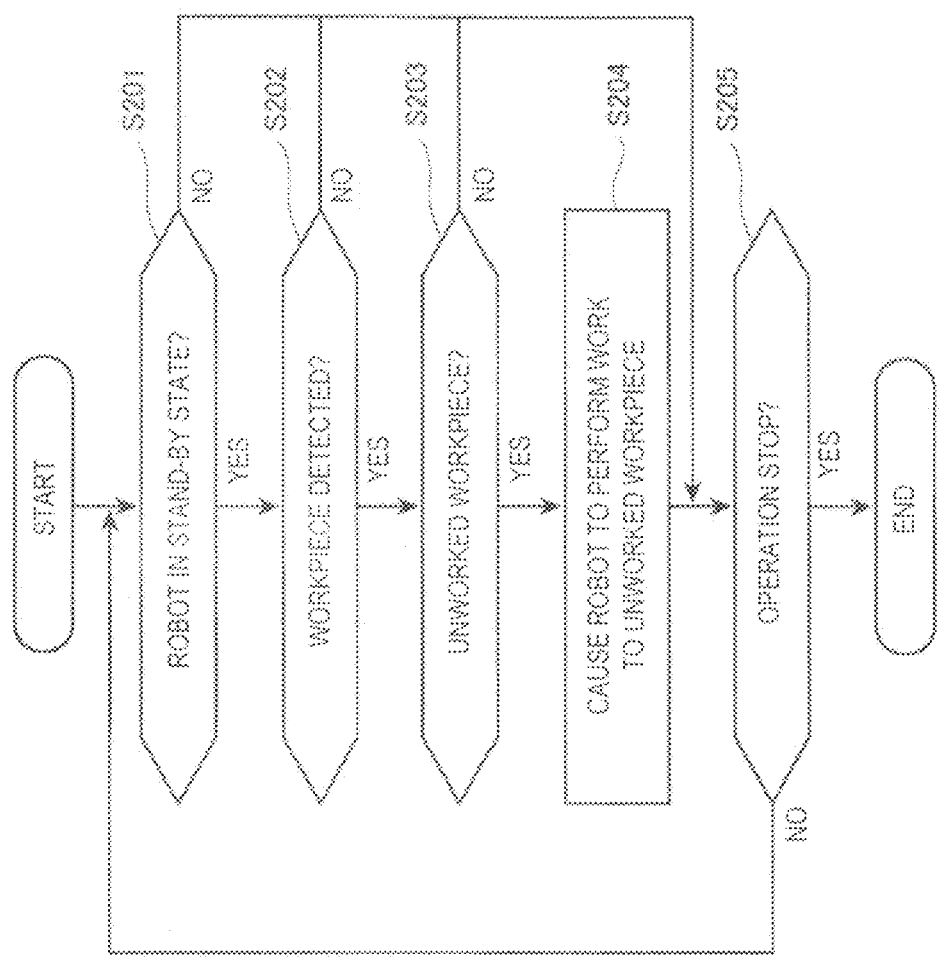
FIG. 5 is a flowchart illustrating one example of operation of a robot system according to an exemplary embodiment.

FIG. 5 is a flowchart illustrating one example of operation of the robot system according to an exemplary embodiment.

First, similar to embodiments described above, the work supply device 104 supplies the unworked workpiece W1 to the transfer device 101, and the transfer device 101 transfers the unworked workpiece W1 supplied from the workpiece supply device 104, and the workpiece W2 to which work has been performed on by the robot 100.

Then, the worker (operator) inputs, via the input device, the command information indicating to execute closing of the unworked workpiece W1 with the lid member C, to the controller 14 of each of the robots 100A and 100B.

Then, as illustrated in FIG. 5, the controller 14 determines whether the robot 100 is in the stand-by state (Step S201). When the controller 14 determines that the robot 100 is not in the stand-by state (NO at Step S201), it executes processing at Step S205. Note that the processing at Step S205 is described later.

On the other hand, when the controller 14 determines that the robot 100 is in the stand-by state (YES at Step S201), it executes processing at Step S202. At Step S202, the controller 14 determines whether the sensor 102 detects the workpiece W.

When the controller 14 determines that the sensor 102 does not detect the workpiece W (NO at Step S202), it executes the processing at Step S205. Note that the processing at Step S205 is described later.

On the other hand, when the controller 14 determines that the sensor 102 detects the workpiece W (YES at Step S202), it executes processing at Step S203. At Step S203, the controller 14 determines whether the workpiece W detected at Step S101 has not yet been worked on.

When the controller 14 determines that the workpiece W detected at Step S202 is not the unworked workpiece W1 (when determined to be the worked workpiece W2; NO at Step S203), it executes the processing at Step S205. Note that the processing at Step S205 is described later.

On the other hand, when the controller 14 determines that the workpiece W detected at Step S202 is the unworked workpiece W1 (YES at Step S203), it causes the robot 100 to perform work on the unworked workpiece W1 (Step S204), and executes the processing at Step S205. Therefore, the robot 100 holds the workpiece W1 by the second hand part 40 of the second arm 13B, sucks and holds the lid member C by the first hand part 30 of the first arm 13A, and operates to close the opening part of the workpiece W1 with the lid member C.

At Step S205, the controller 14 determines whether the operation stop information for the robot system 1 is inputted via the input device. When the controller 14 determines that the operation stop information for the robot system 1 is not inputted (NO at Step S205), it repeats the processing at Steps S201 to S205 until the controller 14 determines that the operation stop information for the robot system 1 is inputted.

On the other hand, when the controller 14 determines that the operation stop information for the robot system 1 is inputted (YES at Step S205), it ends this program.

Also according to the robot system 1 modified as described above, the operation and effects similar to the robot system 1 according to embodiments described earlier can be achieved.

It is apparent for a person skilled in the art from the above description that many improvements and other embodiments of the present disclosure are possible. Therefore, the above description is to be interpreted only as illustration, and it is provided in order to teach a person skilled in the art the best mode to implement the present disclosure. The details of the structures and/or the functions may be substantially changed, without departing from the spirit of the present disclosure. Moreover, various exemplary embodiments may be considered by suitably combining the plurality of components disclosed in the embodiment described above.

Effect of the Disclosure

The robot system and the method of operating the robot system according to the present disclosure may be capable of adapting to the increase and decrease in the amount of production by the simple control.

INDUSTRIAL APPLICABILITY

The robot system and the method of operating the robot system according to the present disclosure is useful to adapt to an increase and a decrease in an amount of production by a simple control.

DESCRIPTION OF REFERENCE CHARACTERS

1 Robot System
11 First Sensor
11A First Sensor
11B First Sensor
12 Second Sensor
12A Second Sensor
12B Second Sensor
13A First Arm
13B Second Arm
14 Controller
14A Controller
14B Controller
15 Carriage
16 Base Shaft
18 Attaching Part
21 Arm Part
21a First Link
21b Second Link
22 Wrist Part
22a Elevating Part
22b Rotary Part
25 Vacuum Generator
30 First Hand Part
31 Body Part
32 Suction Part
33 Pipe
34 On-off Valve
40 Second Hand Part
41 Body Part
42 Chuck part
43 Pinching Part
44 Pinching Part
100 Robot
100A Robot
100B Robot
101 Transfer Device
102 Sensor
102A Sensor
102B Sensor 104 Workpiece Supply Device
105 Lid-member Supply Device
D Transferring Direction
J1 Rotary Joint
J2 Rotary Joint
J3 Linear-motion Joint
J4 Rotary Joint
L1 Rotation Axis
L2 Rotation Axis
L3 Rotation Axis
W Workpiece
W1 Workpiece
W1A Workpiece
W1B Workpiece
W2 Workpiece

What is claimed is:

1. A robot system, comprising:
a transferer that transfers a workpiece;
robots;
a sensor provided to each of the robots and configured to detect the workpiece which is being transferred by the transferer towards the robot and to which work has not yet been performed; and
circuitry provided to each of the robots and configured to control the robot and to determine whether the robot is in a stand-by state,
wherein the robots are disposed in series in a direction of transfer of the workpiece, and
wherein when the sensor detects an unworked workpiece transferred by the transferer towards the robot and the circuitry determines that the robot is in the stand-by state, the circuitry causes the robot to perform work on the unworked workpiece, and when the sensor detects the unworked workpiece and the circuitry determines that the robot is working, the circuitry inhibits the robot to perform the work on the unworked workpiece.

2. The robot system of claim 1, wherein the sensor includes a first sensor configured to detect a position of the workpiece in the transferring direction, and a second sensor configured to detect a state of the workpiece.

3. The robot system of claim 2, wherein the second sensor detects the position of the workpiece in a height direction.

4. The robot system of claim 3, wherein the transferer transfers the workpiece at a given first speed set in advance, regardless of working states of the robots.

5. The robot system of claim 2, wherein the second sensor includes a camera configured to image the workpiece.

6. The robot system of claim 5, wherein the transferer transfers the workpiece at a given first speed set in advance, regardless of working states of the robots.

7. The robot system of claim 2, wherein the transferer transfers the workpiece at a given first speed set in advance, regardless of working states of the robots.

8. The robot system of claim 1, wherein the transferer transfers the workpiece at a given first speed set in advance, regardless of working states of the robots.

9. The robot system of claim 1, wherein each of the robots performs the same work.

10. A method of operating a robot system including:
a transferer that transfers a workpiece;
robots;
a sensor provided to each of the robots and configured to detect the workpiece which is being transferred by the transferer towards the robot and to which work has not yet been performed; and
circuitry provided to each of the robots and configured to control the robot and to determine whether the robot is in a stand-by state,
wherein the robots are disposed in series in a direction of transfer of the workpiece,
the method comprising:
detecting, by the sensor provided to each of the robots, whether an unworked workpiece is being transferred by the transferer towards the robot;
determining, by the circuitry provided to the robot, whether the robot is in a stand-by state;
in response to detecting that the unworked workpiece is being transferred by the transferer towards the robot and determining that the robot is in the stand-by state, performing the work on the unworked workpiece by the robot; and
in response to detecting that the unworked workpiece is being transferred by the transferer towards the robot and determining that the robot is not in the stand-by state, inhibiting the robot to perform the work on the unworked workpiece.

11. The method of claim 10, wherein the sensor includes a first sensor configured to detect a position of the workpiece in the transferring direction, and a second sensor configured to detect a state of the workpiece.

12. The method of claim 11, further comprising:
detecting, by the second sensor, the position of the workpiece in a height direction.

13. The method of claim 11, wherein the second sensor includes a camera configured to image the workpiece.

14. The method of claim 10, further comprising:
transferring, by the transferer, the workpiece at a given first speed set in advance, regardless of working states of the robots.

15. The method of claim 10, wherein each of the robots performs the same work.

16. A robot system, comprising:
means for transferring a workpiece;
robots;
means for detecting the workpiece that is provided to each of the robots to detect the workpiece which is being transferred by the means for transferring towards the robot and to which work has not yet been performed; and
means for controlling a robot that is provided to each of the robots to control the robot and determine whether the robot is in a stand-by state,
wherein the robots are disposed in series in a direction of transfer of the workpiece, and
wherein when the means for detecting detects an unworked workpiece transferred by the means for transferring towards the robot and the means for controlling determines that the robot is in the stand-by state, the means for controlling causes the robot to perform work on the unworked workpiece, and when the means for detecting detects the unworked workpiece transferred by the means for transferring towards the robot and the means for controlling determines that the robot is working, the means for controlling inhibits the robot to perform the work on the unworked workpiece.

* * * * *